United States Patent
Wei et al.

(10) Patent No.: US 11,716,306 B1
(45) Date of Patent: *Aug. 1, 2023

(54) SYSTEMS AND METHODS FOR IMPROVING PACKET FORWARDING THROUGHPUT FOR ENCAPSULATED TUNNELS

(71) Applicant: AVIATRIX SYSTEMS, INC., Santa Clara, CA (US)

(72) Inventors: Xiaobo Sherry Wei, Palo Alto, CA (US); Praveen Vannarath, Sunnyvale, CA (US)

(73) Assignee: Aviatrix Systems, Inc., Santa Clara, CA (US)

(*) Notice: Subject to any disclaimer, the term of this patent is extended or adjusted under 35 U.S.C. 154(b) by 85 days.

This patent is subject to a terminal disclaimer.

(21) Appl. No.: 17/208,749

(22) Filed: Mar. 22, 2021

Related U.S. Application Data

(63) Continuation of application No. 16/403,353, filed on May 3, 2019, now Pat. No. 10,958,620.

(Continued)

(51) Int. Cl.
  *H04L 12/46* (2006.01)
  *H04L 61/2592* (2022.01)
  (Continued)

(52) U.S. Cl.
  CPC ........ *H04L 61/2592* (2013.01); *H04L 45/125* (2013.01); *H04L 45/72* (2013.01); *H04L 45/7453* (2013.01); *H04L 61/5007* (2022.05)

(58) Field of Classification Search
  CPC ... H04L 12/46; H04L 12/66; H04L 29/06068; H04L 29/06095; H04L 29/08009; H04L 45/125; H04L 45/72; H04L 45/74; H04L 45/7453; H04L 49/255; H04L 49/30; H04L 61/2007; H04L 61/5007; H04L 61/2592;

(Continued)

(56) References Cited

U.S. PATENT DOCUMENTS 9,286,444 B2  3/2016  Ogg et al.
9,356,866 B1  5/2016  Sivaramakrishnan et al.
(Continued)

OTHER PUBLICATIONS

Klassert, Parallelizing IPsec: switching SMP to 'On' is not even half the way, SECUNET, 41 pages, Jun. 11, 2010.*

(Continued)

*Primary Examiner* — Frank Duong
(74) *Attorney, Agent, or Firm* — Winstead PC

(57) ABSTRACT

A computerized method for increasing throughput of encapsulated data over a network is described. First, a determination, at a first network device, of a number of available processing resources located at a second network device is conducted. Thereafter, a plurality of connections are generated between the first network device and the second device. The plurality of connections corresponding in number to the number of available processing resources. Data received by the first network device is associated with a first connection of the plurality of tunneling connections. Thereafter, translation data unique to a tunneling session associated with the first connection is generated and the received data is encapsulated with the translation data to generate the encapsulated data for transmission to the second network device.

23 Claims, 5 Drawing Sheets

Related U.S. Application Data

(60) Provisional application No. 62/666,291, filed on May 3, 2018.

(51) Int. Cl.
  *H04L 45/125* (2022.01)
  *H04L 45/00* (2022.01)
  *H04L 45/7453* (2022.01)
  *H04L 61/5007* (2022.01)

(58) Field of Classification Search
  CPC ......... H04L 2012/46; H04L 2012/5629; H04L 2012/5618
  See application file for complete search history.

(56) References Cited

U.S. PATENT DOCUMENTS

| | | | |
|---|---|---|---|
| 9,641,435 B1 * | 5/2017 | Sivaramakrishnan | H04L 69/166 |
| 9,674,088 B1 * | 6/2017 | Sivaramakrishnan | H04L 47/31 |
| 9,736,278 B1 * | 8/2017 | Hammam | H04L 67/1001 |
| 10,623,372 B2 * | 4/2020 | Wang | H04L 63/0227 |
| 10,958,620 B1 | 3/2021 | Wei et al. | |
| 10,986,075 B2 * | 4/2021 | Ammanur | H04L 69/164 |
| 11,095,617 B2 * | 8/2021 | Jain | H04L 63/0428 |
| 2002/0010866 A1 | 1/2002 | McCullough et al. | |
| 2003/0223418 A1 * | 12/2003 | Desai | H04L 47/10 370/395.5 |
| 2010/0246593 A1 * | 9/2010 | Belanger | H04L 49/20 370/419 |
| 2013/0114599 A1 * | 5/2013 | Arad | H04L 45/745 370/392 |
| 2014/0301388 A1 * | 10/2014 | Jagadish | H04L 67/563 370/389 |
| 2018/0069924 A1 | 3/2018 | Tumuluru et al. | |
| 2019/0132297 A1 * | 5/2019 | Ammanur | H04L 69/22 |
| 2019/0173841 A1 | 6/2019 | Wang et al. | |
| 2019/0173850 A1 | 6/2019 | Jain et al. | |

OTHER PUBLICATIONS

U.S. Appl. No. 16/403,353, filed May 3, 2019 Non-Final Office Action dated Jun. 8, 2020.

U.S. Appl. No. 16/403,353, filed May 3, 2019 Notice of Allowance dated Nov. 6, 2020.

Varadha, Securing Traffic Tunnelled over TCP or UDP, Proceedings of netdev 1.1, 7 pages, Feb. 10, 2016.

* cited by examiner

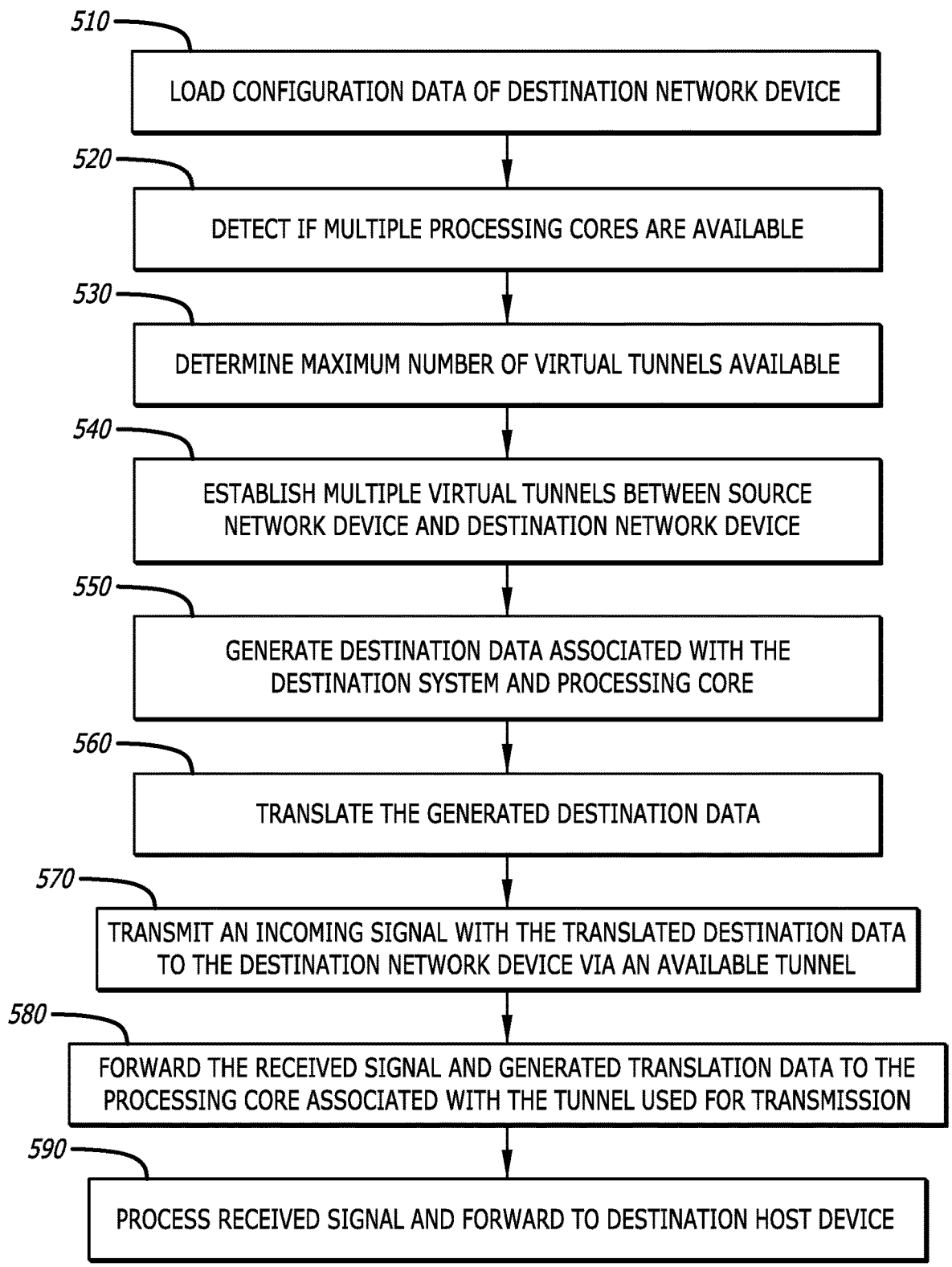

SYSTEMS AND METHODS FOR IMPROVING PACKET FORWARDING THROUGHPUT FOR ENCAPSULATED TUNNELS

RELATED MATTERS

This application is a continuation of U.S. patent application Ser. No. 16/403,353 filed May 3, 2019, now U.S. Pat. No. 10,958,620 issued Mar. 23, 2021, which claims the benefit of priority on U.S. provisional application no. 62/666,291, filed May 3, 2018, the entire contents of all of these applications are incorporated by reference herein.

FIELD OF THE DISCLOSURE

Embodiments of the present disclosure relate to systems and methods that utilize multiple signal transmission tunnels between network devices in order to fully utilize available processing power.

BACKGROUND

Modern computing operating systems support symmetric multi-core processing, which provide the ability to distribute the workload of processing data and packets between different processor cores or other computing resources. These multi-core processors may be traditional central processing units ("CPUs"), digital signal processors, application specific integrated circuits ("ASICs"), field programmable gate arrays ("FPGAs"), or any hardware or virtual software component with multiple data processing elements. The multi-core processor may be deployed within many different types of electronic devices, including network devices such as a computing device (e.g. desktop computer, laptop computer, tablet, smartphone, gaming console, set top box, etc.), servers, routers, or other switching devices.

Modern computing operating systems also have the ability to transmit packets of information across networks via packets and direct them to be processed by particular cores on the destination device. The ability to "steer" transmitted or received packets to different processing cores is often referred to as receive packet steering ("RPS"). In certain embodiments of RPS, packets can be distributed to different cores based on a hash result of information included in the IP header of the packet.

However, utilizing RPS is not effective when the packets are needed to be encapsulated during transmission. By way of example and not limitation, when utilizing the Internet protocol security (IPSEC) stack to encrypt and decrypt packets, a receiving device having multiple cores may utilize those extra cores to increase the processing throughput of the IPSEC packets. Often, when two network devices need to communicate in this manner over an IPSEC tunnel, it is often accomplished by encapsulating the IPSEC packet and placing the encrypted IPSEC packet within a transmission control protocol ("TCP") or user diagram protocol ("UDP") header.

As a result of the example above, communications between the two network devices operate only as a single TCP or UDP session because the hash result produced by information within the IP header is a constant value during the TCP/UDP session. When there is only one tunneling session (such as TCP or UDP) active between the two network devices, the RPS technique cannot be properly utilized at the receiving side, thus leaving the available processing cores and/or resources underutilized (i.e., decreasing throughput potential). Therefore, there is a need develop systems and methods to increase throughput in networking sessions.

BRIEF DESCRIPTION OF THE DRAWINGS

The embodiments are illustrated by way of example and not by way of limitation in the figures of the accompanying drawings in which like references indicate similar elements. It should be noted that references to "an" or "one" embodiment in this disclosure are not necessarily to the same embodiment, and they mean at least one. In the drawings:

FIG. 5 illustrates a method for utilizing multiple processing resources via a plurality of encapsulated tunnels between multiple network devices of FIGS. 2-4.

DETAILED DESCRIPTION

Figure 1:
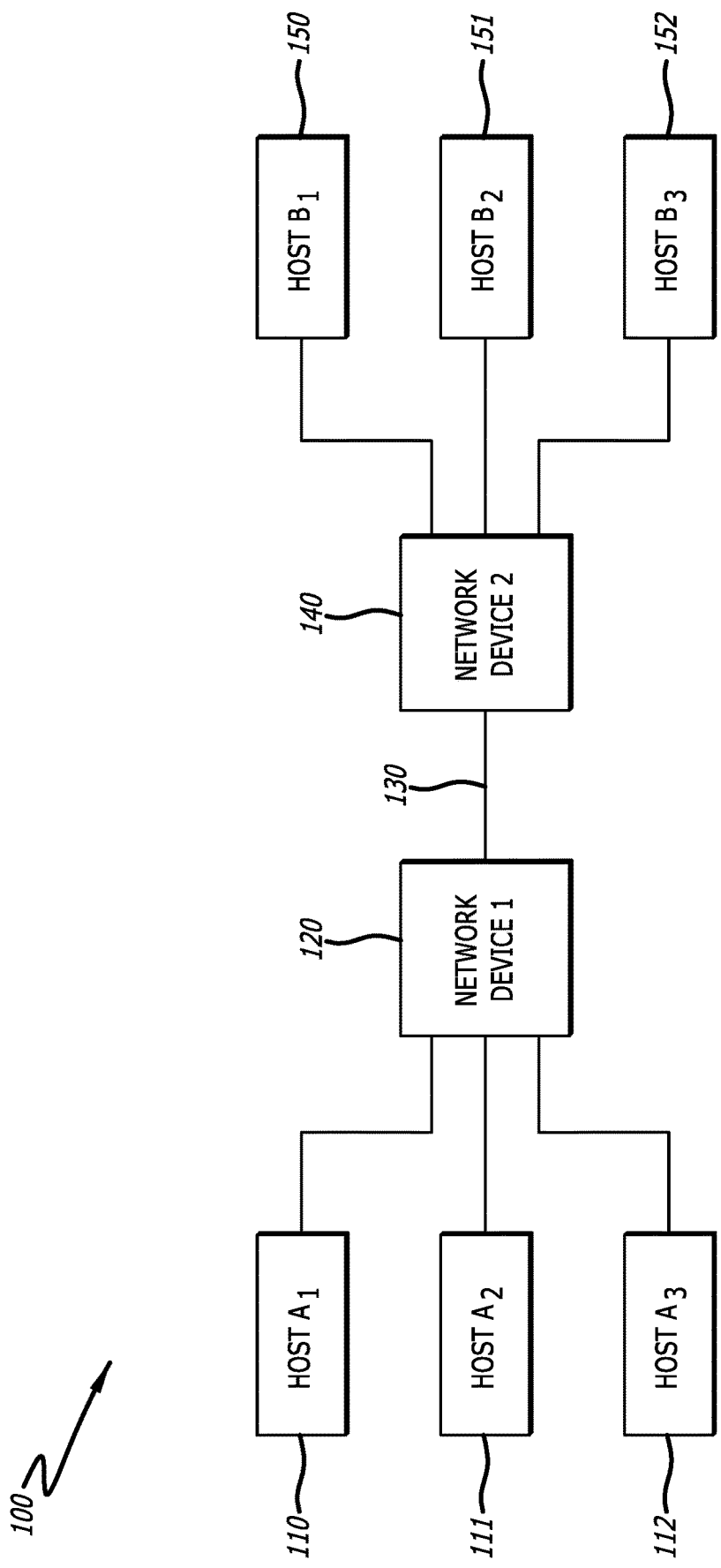
FIG. 1 illustrates an illustrative block diagram of a communication system operating in accordance with prior art.

Various embodiments of the disclosure relate to systems and methods for improving packet forwarding throughput for encapsulated tunnels, namely via a mechanism that generates and utilizes multiple data transmission tunnels between network devices. Herein, multiple (i.e., two or more) network devices within a communication system are deployed over a network or other transmission medium such as the Internet. Other host computing devices may be attached to the network device which can utilize their connection with the network device to take advantage of the increased throughput provided by the network devices utilizing embodiments of the invention disclosed herein.

A network device may receive multiple data from a particular host computing device which is bound to be sent to a remote host computing device. In fact, a network device may receive data from a number of connected host computing devices which may want to deliver their respective data packets to a plurality of other remote host computing devices. In traditional communication systems, all data incoming into the first network device can only be encapsulated and sent over a single tunneling session to the remote second network device. As a result, the received data at the second computing device is all encapsulated with the same data (e.g., an internet protocol ("IP") header) associated with the tunneling session used to transmit the data. In these traditional communication systems, the decapsulation and decryption is therefore limited to a single processing core of the second network device.

As those skilled in the art will recognize, utilizing only a single core creates large inefficiencies when multiple cores are available for processing in the second network device. Indeed, the level of inefficiency in the traditional communication system increases in scale as the number of processing cores available (and unutilized) increases. In order to address this inefficiency, embodiments of the invention disclosed herein allocate multiple logical interfaces including secondary and/or virtual IP addresses to create multiple tunneling sessions between the first and second computing device. In many embodiments, each additional logical interface is assigned a unique IP address at both the first and second network device. In preferred embodiments, the number of additional logical interfaces is greater or equal to the number of available processing cores on the second network device.

The first network device can include a demultiplexer module which can generate translation data associated with a certain tunneling session established between the first and second network devices. In certain embodiments, the translation data includes a one-way hashing operation on data contained within the IP header of the packet for transmission. The translation data is encapsulated with or otherwise attached and/or associated with the packet during transmission to the second network device. Upon receipt of the data at the second network device, the second network device can examine the packet and associated translation data to determine which processing core should receive and process the packet. Once processed, the packet can be sent to the destination host computing device.

As an illustrative example, a first local host device and second local host device are connected to a first network device, with a first remote host device and second remote host device connected to a second network device which is connected over a network to the first network device. In the above example, the first host device has data to send to the first remote host device and the second host device has data to send to the second remote host device. In traditional systems, both sets of data from the first and second local host would be transmitted over a single tunneled connection from the first network device to the second network device which would then utilize the same core to process and forward the data to each respective remote host device. However, with embodiments of the present invention, a first tunneled connection between the first and second network device can be assigned to the data being transmitted from the first local host device to the first remote host device, and a second tunneled connection can be designated for carrying data from the second local host device to the second remote host device. In this way, each tunneled connection can be processed by a separate processing core and can thus theoretically double the processing efficiency of the data at the second network device. It can be understood by those skilled in the art, that such increased efficiencies will scale as the number of available processing cores and associated tunneled connections increases.

In the above example, a single tunneled connection was associated with a single local host device communicating with a single remote host device. In preferred embodiments, each tunneled connection would be associated with a single communication session such that issues with parallelism and/or packet out-of-order issues can be avoided. As those skilled in the art understand, each tunneling session between host devices through network device intermediaries may be provisioned and/or released in varying amounts of time, including very short time intervals based on the needs of the applications utilized. Thus, it is contemplated that such a network device and or method may dynamically create tunneled connections based on any of available computing algorithms which may increase overall communication system efficiencies (e.g. CPU idle time, etc.).

It is also contemplated any reference to network devices, host devices, and/or other components which indicates a hardware or other physical device may also be implemented in a cloud-based system capable of scaling through elastic computers ("ECs") available to the communication system. This can include entire network devices that are virtually created and provisioned by third-party cloud computing services.

Finally, although embodiments and discussions herein reference a single network device communicating with another single network device, it is understood that the connections between network devices are not to be limited in this manner and can comprise any number of network devices and/or host computing devices. Indeed, a mesh network may be constructed with each network device utilizing a plurality of tunneled connections to each of the processing cores available on other network devices within the mesh network. Additionally, each network device configured to receive demultiplexed data from a first network device may also be configured to send back data to the first network device or any other network or host device utilizing the same methods described herein.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

I. Terminology

Herein, certain terminology is used to describe features for embodiments of the disclosure. For example, each of the terms "logic" and "component" may be representative of hardware, firmware or software that is configured to perform one or more functions. As hardware, the term logic (or component) may include circuitry having data processing and/or storage functionality. Examples of such circuitry may include, but are not limited or restricted to a hardware processor (e.g., microprocessor, one or more processor cores, a digital signal processor, a programmable gate array, a microcontroller, an application specific integrated circuit "ASIC", etc.), a semiconductor memory, or combinatorial elements.

Additionally, or in the alternative, the logic (or component) may include software such as one or more of the following: process, instance, Application Programming Interface (API), subroutine, function, module, script, applet, servlet, routine, source code, object code, shared library/dynamic link library (dll), or even one or more instructions. This software may be stored in any type of a suitable non-transitory storage medium, or transitory storage medium (e.g., electrical, optical, acoustical or other form of propagated signals such as carrier waves, infrared signals, or digital signals). Examples of a non-transitory storage medium may include, but are not limited or restricted to a programmable circuit; non-persistent storage such as volatile memory (e.g., any type of random access memory "RAM"); or persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the logic (or component) may be stored in persistent storage.

The term "network device" generally refers to any physical electronics or virtualized logic that includes processing functionality (e.g., circuitry, virtual computing engines, etc.) running at least one process adapted to control communications via a network. Examples of network devices may include a server, a web server, an authentication server, an authentication-authorization-accounting (AAA) server, a Domain Name System (DNS) server, a Dynamic Host Configuration Protocol (DHCP) server, an Internet Protocol (IP) server, a Virtual Private Network (VPN) server, a network policy server, a mainframe, a routing device (e.g., router, switch, brouter, controller, etc.) or a client device (e.g., a television, a content receiver, a set-top box, a computer, a tablet, a laptop, a desktop, a netbook, a video gaming console, a television peripheral, a printer, a mobile handset, a smartphone, a personal digital assistant "PDA," a wireless receiver and/or transmitter, an access point, or a base station).

It is contemplated that a network device may include hardware logic such as one or more of the following: (i) processing circuitry; (ii) one or more communication interfaces such as a radio (e.g., component that handles the wireless data transmission/reception) and/or a physical connector to support wired connectivity; and/or (iii) a non-transitory computer-readable storage medium described above.

The term "transmission medium" may be construed as a physical or logical communication path between two or more network devices or between components within a network device. For instance, as a physical communication path, wired and/or wireless interconnects in the form of electrical wiring, optical fiber, cable, bus trace, or a wireless channel using radio frequency (RF) or infrared (IR), may be used. A logical communication path may simply represent a communication path between the two network devices or components, independent of the physical medium used.

The term "computerized" generally represents that any corresponding operations are conducted by hardware in combination with software and/or firmware.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

II. Communication System Architecture

A. Prior Art

Referring to FIG. 1, a block diagram of a communication system 100 operating in accordance with prior art is shown. In traditional systems, the communication system 100 features a first network device 120, which is commutatively coupled to a plurality of host devices 110-112, such as computing terminals or other network devices. It may be desired to transmit data from the host devices 110-112 coupled with the first network device 120 to other remote host devices 150-152 commutatively coupled to a second network device 140. Although shown as including two network devices 120, 140, three host devices 110-112 and remote host devices 150-152, communication systems 100 may include any number of host devices, remote host devices and network devices.

It may be desired by users of one of the host devices 110-112 to utilize receive packet steering ("RPS") to steer packets to specific cores (or other computing resources available) in order to facilitate packet forwarding to at least one of the remote host devices 150-152, thus increasing processing throughput. However, traditional communication systems 100 typically create a single tunnel 130 between a first network device 120 and second network device 140 when encapsulating outgoing data. The process of encapsulation often involves encrypting or otherwise obscuring the data so the contents cannot be easily exploited by anyone reading or otherwise intercepting the data over the network between the first network device 120 and second network device 140.

However, upon encapsulation, data related to RPS is also obscured. Thus, when received by the second network device 140, there is no available data to facilitate the second network device 140 to determine which core or other available processing resources should decapsulate and process the received data. In these traditional communication systems 100, the second network device 140 can only utilize a single core or computing resource to process the incoming data. It is desirable to utilize any available processing resources to increase the throughput of a communication system.

B. Enhanced Throughput Communication Systems

Figure 2:
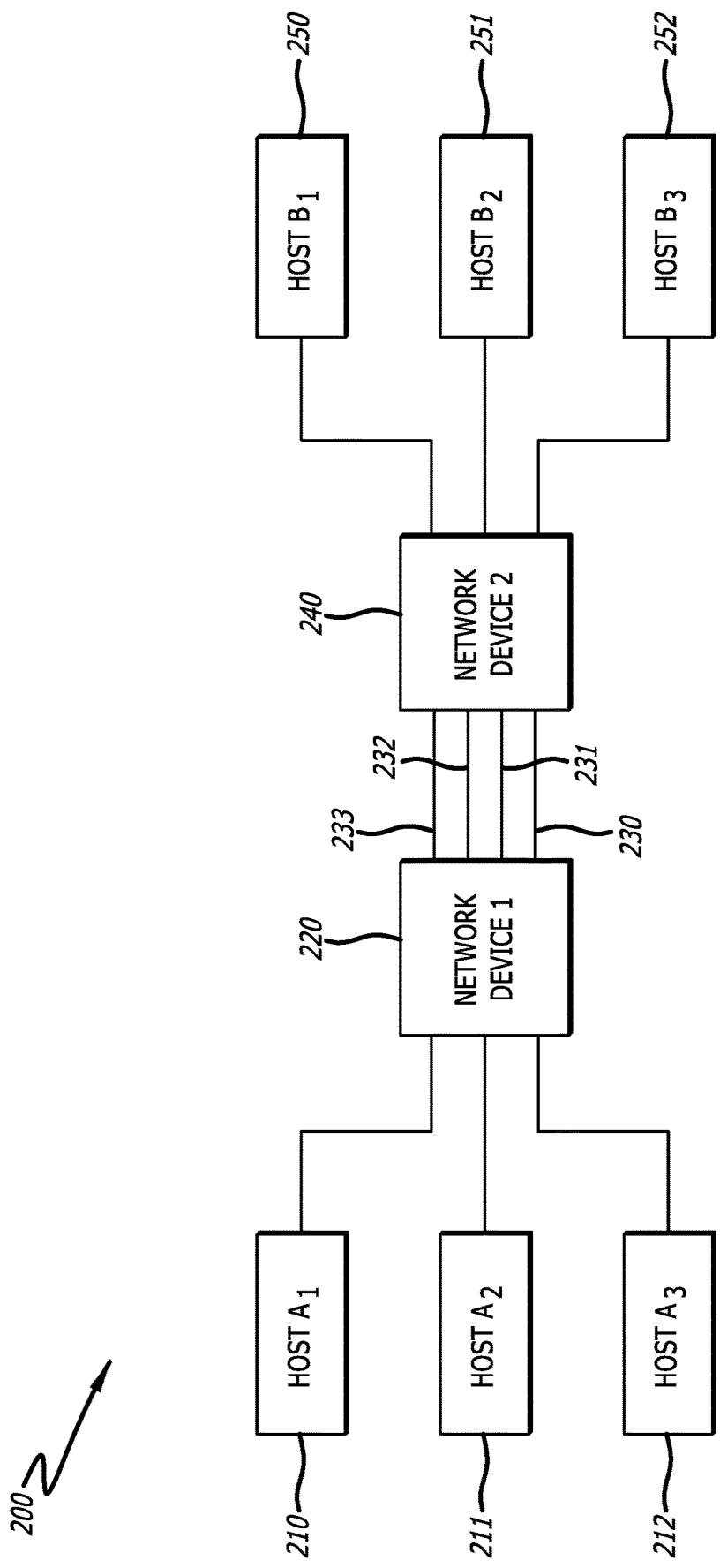
FIG. 2 illustrates an exemplary block diagram of a communication system operating in accordance with an embodiment of the invention.

Referring to FIG. 2, an exemplary block diagram of an enhanced throughput communication system 200 operating in accordance with an embodiment of the invention is shown. In many embodiments, the enhanced throughput communication system 200 features a first network device 220, which is commutatively coupled to a plurality of host devices 210-212. As in FIG. 1, it may be desired to transmit data from the host devices 210-212 to other remote host devices 250-252 which are commutatively coupled to a second network device 240. Although shown as including two network devices 120, 140, three host devices 110-112 and remote host devices 150-152, various embodiments of the enhanced throughput communication system 200 may include any number of host devices, remote host devices and network devices based on the application needs of the user and/or network administrator.

Unlike the traditional communication system 100 depicted in FIG. 1, the enhanced throughput communication system 200 utilizes a plurality of tunneled connections 230-233 between the first network device 220 and second network device 240. In a number of embodiments, this is accomplished through the use of interface and/or tunneling logic within the first network device 220 and second network device 240 along with a demultiplexer logic 340A within the first network device 220 that can process and queue data received from the host devices 210-212 that are bound for any of the remote host devices 250-252.

In many embodiments, each of the tunneled connections 230-233 are associated with a single unique session. In additional embodiments, the tunneled connections can consist of any of a variety of encapsulated security protocols including, but not limited to IPSEC and/or generic routing encapsulation ("GRE"). Additionally, as described above, the plurality of tunneled connections 230-233 can be associated with a single session between two host devices. As an illustrative example, host $A_1$ 210 may seek to establish a connection with host $B_1$ 250 while host $A_3$ 212 seeks to send data directly to host $B_3$ 252. In one embodiment of the above example, the first network device 1, may generate and/or utilize a first tunneled connection 230 to handle the data transfer between host $A_1$ 210 and host $B_1$ 250, while the second tunneled connection 231 is utilized to handle the data transfer between host $A_3$ 212 and $B_3$ 252. In this way, each communication channel between host devices is dedicated to a single tunneled connection. In additional embodiments, the remaining two tunneled connections 232, 233 could be utilized by the first network device 220 to provide even more throughput potential to the host devices communicating over the system 200. The first network device 220 may handle the extra tunneled connections and send packets back and forth as needed or utilize a round robin system to better utilize the increased tunneled connections 230-233.

C. Network Device Architecture

Figure 3A:
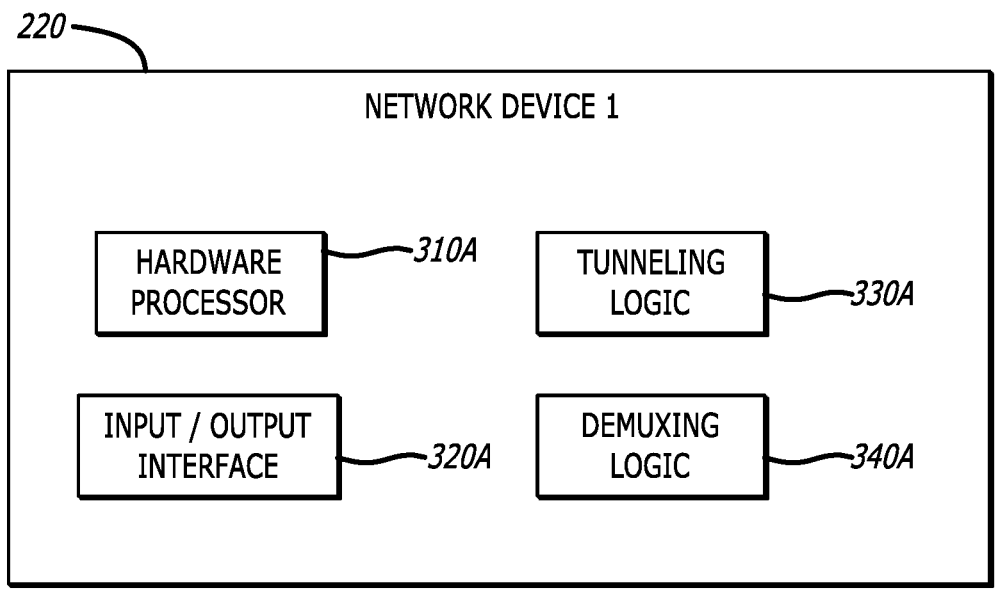
FIG. 3A illustrates an exemplary embodiment of a component diagram of a transmitting network device within the communication system of FIG. 2.

Referring to FIG. 3A, an exemplary embodiment of a component diagram of a transmitting first network device 220 within the communication system 200 of FIG. 2 is shown. A first network device 220 may be comprised of a hardware processor 310A which may or may not be multi-core, an input/output interface 320A which can access a plurality of physical and/or virtual inputs or outputs of the first network device 220. In various embodiments, the first network device 220 can be a gateway which connects other host devices to a network. Such a gateway can be either a hardware-based gateway or a virtualized gateway within a cloud-computing environment. In further embodiments, the first network device 220 may be a part of an elastic computing system/instance. In these and other similar embodiments, the hardware processor 310A may be part of another computing system and/or virtualized within another computing environment.

The first network device 220 may also comprise tunneling logic 330A to generate and manage a plurality of tunneled connections in concert with the various inputs and outputs available with the input/output interface 320A. Each input and output is assigned as a unique logical interface. Each logical interface is assigned a unique IP address through the use of secondary or virtual address. The tunneling logic 330A is often configured to encapsulate the outgoing data as well as to decapsulate the incoming data utilizing the hardware processor 310A. In a number of embodiments, the tunneling logic can use an established encapsulation method such as GRE or IPSEC for the purposes of generating a tunnel between the first network device 220 and the second network device 240.

In many embodiments, the first network device 220 comprises a demultiplexer (demuxing) logic 340A for assigning and queueing outgoing data to particular tunnels established by the tunneling logic 330A. In certain embodiments, the demuxing logic 340A determines the number of available cores on the second network device 240, along with the potential number of available tunnels that can be created in conjunction with the tunneling logic 330A. In other embodiments, this determination of available cores and tunnels is handled by the tunneling logic 330A.

Upon determination, each tunnel can be assigned to a particular core or processing resource and be made available for host device connections. Thus, in these embodiments, the demuxing logic 340A should be session aware. When needed for data transmission, a particular number or other marker is assigned to a particular tunnel. Upon receipt of the data for transmission to a particular processing core, the demuxing logic 340A can perform operations to encapsulate and mark the data packet before queueing and then transmitting the data on the assigned tunnel connection to the second network device 240.

In one illustrative example, the demuxing logic 340A can take specific data related to the packets in order to generate a tuple of elements for the creation of the marker. A tuple could be comprised of the IP address of the source and destination host machines for the packet as well as the port numbers associated with the source and destination host device. With these four elements in the tuple, which can then be integrated into the IP header, the demuxing logic 340A can then perform a hashing operation to generate a one way hash result which may then undergo a modulo N operation to generate a unique marker which can then be attached and transmitted to the second network device 240. The "N" in the module N operation relates to the number of available processing cores or other computing resources available in the second network device 240. However, the "N" may relate to the number of already-established tunneled connections (which may be more than the number of available processing cores).

In an alternative embodiment, the marker may be generated based on meta data associated with the packet by RPS algorithms utilized in the first network device 220, thereby alleviating the need to generate a hash for every packet. The demuxing logic 340A may also load balance the packets for the receiving end. It would be understood by those skilled in the art that such load balancing can be realized through any number of techniques known in the art.

Figure 3B:
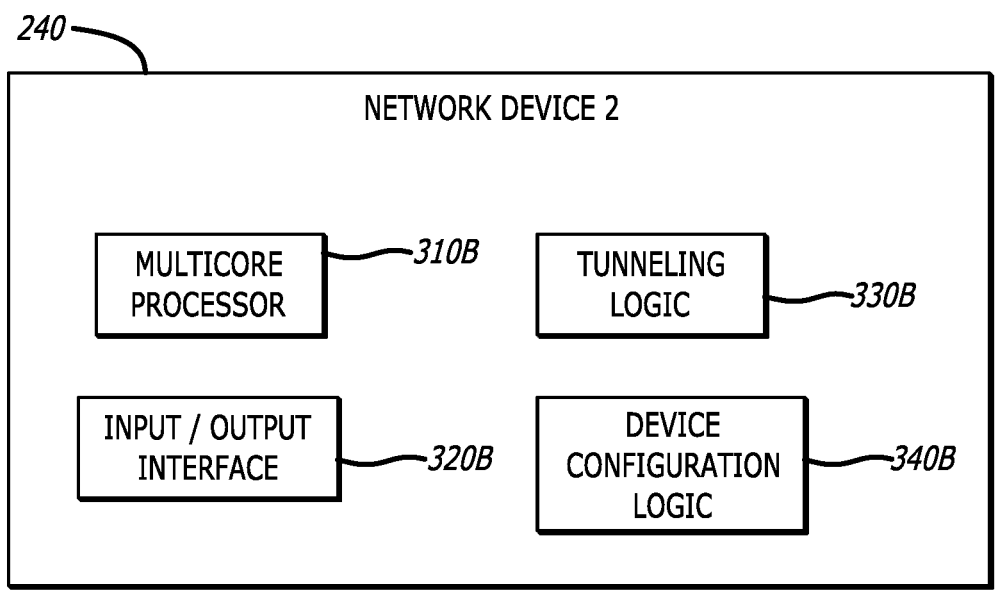
FIG. 3B illustrates an exemplary embodiment of a component diagram of a receiving network device within the communication system of FIG. 2.

Referring to FIG. 3B, an exemplary embodiment of a component diagram of a receiving second network device 240 within the communication system 200 of FIG. 2 is shown. Similar to the first network device 220, the second network device 240 may be comprised of a multicore processor 310B, and an input/output interface 320B which can access a plurality of physical and/or virtual inputs or outputs of the second network device 240. In various embodiments, the second network device 240 can be a gateway which connects other host devices to a network. Such a gateway can be either a hardware-based gateway or a virtualized gateway within a cloud-computing environment. In further embodiments, the second network device 240 may be a part of an elastic computing system/instance. In these and other similar embodiments, the multicore processor 310B may be part of another computing system and/or be virtualized within another computing environment.

The second network device 240 may also comprise tunneling logic 330B similar to the tunneling logic 330A to generate and manage a plurality of tunneled connections in concert with the various inputs and outputs available with the input/output interface 320B. Each input and output is assigned as a unique logical interface. Each logical interface is assigned a unique IP address through the use of secondary or virtual address. The tunneling logic 330B is often configured to encapsulate the outgoing data as well as to decapsulate the incoming data utilizing the multicore processor 310B. In a number of embodiments, the tunneling logic can use an established encapsulation method such as GRE or IPSEC for the purposes of generating a tunnel between the second network device 240 and the first network device 220. Typically, when receiving data from the tunneling logic 330B, each tunneling session may only utilize a single core of the multicore processor 310B.

In a variety of embodiments, the second network device 340B may further comprise a device configuration logic 340B. Often, the device configuration logic 340B generates device configuration data related to the characteristics of the second network device. Device configuration data may be comprised of data relating to the number of processing cores that are available in the second network device 240 as well as the number of available physical and or virtual logical interfaces. In embodiments where this device configuration data is provided or otherwise obtainable by the first network device 220, the first network device 220 may then more efficiently generate the proper (or more efficient) number of tunneled connections to the second network device 240. In certain embodiments, the device configuration data may be held by a controller within the communication system or within other account files owned or accessible by the user and/or system.

Although various embodiments have been discussed above in relation to FIGS. 3A-3B regarding first and second network devices 220, 240, it would understood by those skilled in the art that communication between such devices does not always have to be in the direction of the first network device 220 to the second network device 240, and in fact, can be bi-directional. Therefore, it is contemplated that elements and/or components of each network device may also be found in the other network device to facilitate such bi-directional communication.

III. Transmission Between Network Devices

Figure 4:
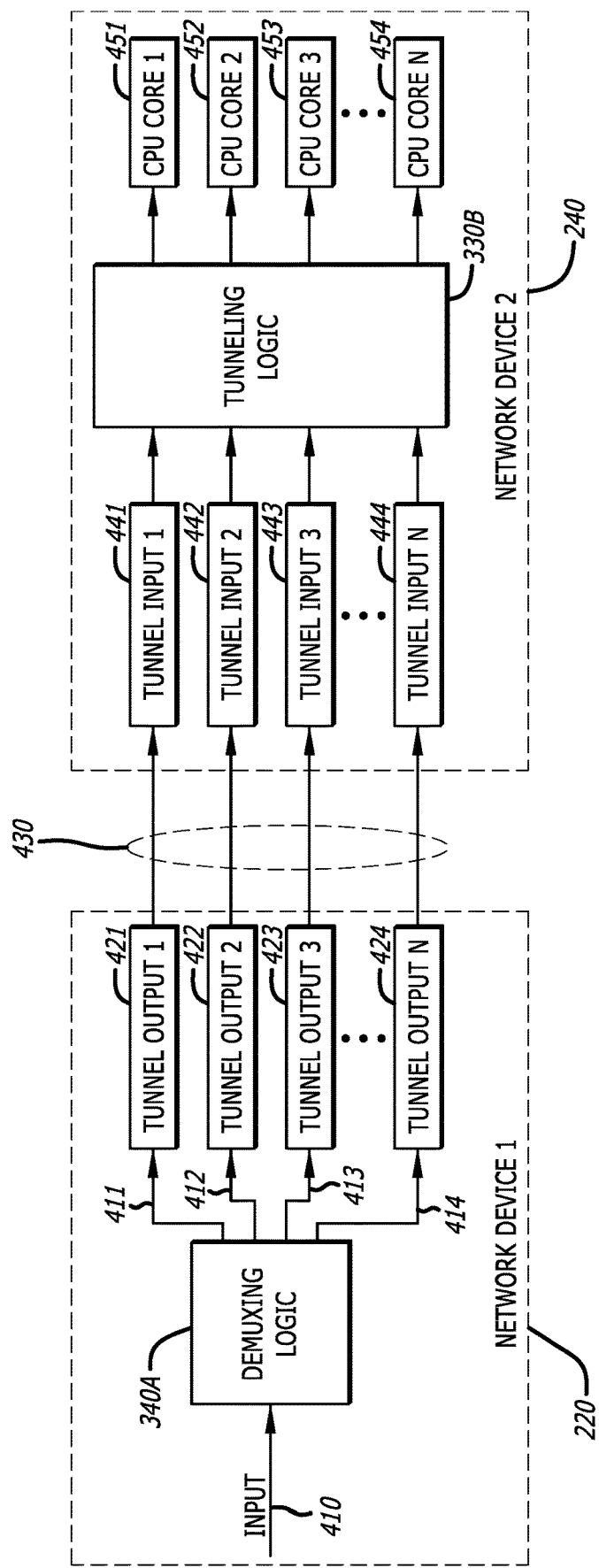
FIG. 4 illustrates an exemplary logical representation of utilizing multiple encapsulated tunnels within the communication system of FIG. 2.

Referring now to FIG. 4, an exemplary logical representation of utilizing multiple encapsulated tunnels 430 within the communication system 200 of FIG. 2. In response to the first network device 220 receiving an input 410 from any external host devices, the input 410 is fed into the demuxing logic 340A for processing and queueing into one of the tunneled connection outputs 411-414. The demuxing logic 340A is thus commutatively coupled with one or more tunnel outputs 421-424. The tunnel outputs 421-424 transmit out their assigned data over a network to their respective tunnel inputs 1-N (N>1) 441-444 within a second network device 240.

Once received by the second network device 240, the data received from the tunnel inputs 441-444 can then be processed by the tunneling logic 330B. In many embodiments, the tunneling logic 330B may examine the marker attached to the data packets to determine which of the available CPU cores 1-N (N>1) 451-454 can be utilized to process the packet. In alternative embodiments, the tunneling logic may simply associate data packets received from a specific tunnel input 441-444 to a specific CPU Core 451-454.

Although shown as including only four tunneled connections 430, in other embodiments, there may be any number of tunneled connections. Additionally, while the demuxing logic 340A is shown to be in direct connection with the tunnel outputs 421-424 through a series of tunneled connection outputs 411-414, some embodiments may utilize the tunneling logic 330A to generate, manage, and/or pass the processed data from the demuxing logic 340A to the tunnel outputs 1-N (N>1) 421-424.

Referring now to FIG. 5, a method 500 for utilizing multiple processing resources 451-454 via a plurality of encapsulated tunnels 430 between multiple network devices 220, 224 of FIGS. 2-4. In a number of embodiments, the method 500 can begin by loading the configuration data of a particular destination network device (operation 510). As discussed above, certain embodiments of the invention provide configuration data detailing aspects of a potential destination network device which may be generated by a device configuration logic 340B or reside in a controller or other location within a user account and/or network.

Based on the loaded configuration data, the method 500 may then detect if multiple processing cores are available in the destination network device (operation 520). Additionally, in response to both the loaded configuration data and the known configuration of the source network device, the number of potential virtual tunnels may be determined (operation 530). As discussed above, many embodiments can have configurations that allow for many more virtual tunnels available than processing cores. In these instances, the excess tunnels may be utilized in a round robin or other similar fashion to increase the potential throughput of the method 500. Once determined, the source network device and destination network device can then establish the proper number of tunnels between them (operation 540). Again, as discussed above, the type of tunnel and/or encapsulation standard utilized can vary and may be any available standard or method suitable for encapsulating data for transfer over a public network.

In a variety of embodiments, the method 500 may generate destination data associated with the data being sent (operation 550). This destination data may be associated with the destination system and processing core. In other embodiments, the destination data may be in the form of an IP header comprising the source and destination IP address and port numbers. Such destination data can be translated in order to create a marker or other "residue" which can be packaged with a packet for later processing by the destination network device (operation 560). This marker may be the result of a hashing and module N operation, or may be data generated from an RPS process on the source network device.

Once prepared the method 500 may encapsulate the data with the translated destination data and transmit the data via an assigned tunnel (operation 570). The transmission between the source and destination network devices may hop over numerous other devices along the path. It is contemplated that the connection between the source and destination network devices can be of any length and have any number of intermediary hopping points or other network devices which may further encapsulate the data, including via methods outline herein.

In response to receiving data, the destination network device may then analyze the marker or other translation data to determine which processing core or other computing resource should process the data (operation 580). As discussed above, the forwarding process at the destination network device can be achieved in a variety of methods including, but not limited to, evaluating the marker associated with the received data, directly associating data received on a particular tunnel connection with a particular processing core, through other CPU processing core algorithms available to the destination network device.

Finally, the forwarded signal is processed by the assigned processing core and is subsequently forwarded to the destination host device (operation 590). Typically, the processing within the processing core comprises decapsulating the packet and, if needed, decrypting the encrypted data within the packet.

Any combination of the above features and functionalities may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A system for increasing throughput of encapsulated data over a network, comprising:
a first network device; and
a second network device communicatively coupled to the first network device,
wherein the first network device comprises
a tunneling logic to generate and manage a first plurality of connections, the first plurality of connections corresponding in number to a plurality of virtual computing resources; and
a demultiplexer logic configured to (i) receive a plurality of data for transmission, (ii) associate the received data with a first connection of the first plurality of connections, (iii) generate translation data unique to a tunneling session associated with the first connection of the first plurality of connections, and (iv) encapsulate the received data with the translation data prior to transmission during the tunneling session.

2. The system of claim 1, wherein the first network device is deployed as part of a cloud-computing environment.

3. The system of claim 2, wherein the plurality of virtual computing resources comprise a plurality of elastic computing devices.

4. The system of claim 3, wherein each of the plurality of elastic computing devices corresponds to a virtualized processor.

5. The system of claim 1, wherein the demultiplexer logic is configured to generate the translation data by at least conducting a hashing operation on information associated with an Internet Protocol (IP) header for one or more packets corresponding to the received data.

6. The system of claim 5, wherein the demultiplexer logic is configured to generate the translation data by conducting a modulo operation on a hash result generated by the hashing operation being conducted on information associated with the IP header for the one or more packets.

7. The system of claim 5, wherein the translation data comprises a tuple of elements as at least part of the information within the IP address, the tuple includes addressing and port information pertaining to the one or more packets.

8. The system of claim 1, wherein the first plurality of connections correspond to a first plurality of tunnels operating in accordance with Internet Protocol Security (IPSEC).

9. The system of claim 1, wherein the first plurality of connections correspond to a first plurality of tunnels operating in accordance with Generic Routing Encapsulation (GRE).

10. The system of claim 1, wherein the demultiplexer logic is configured to generate the translation data based on meta data associated with one or more packets corresponding to the received data.

11. A computerized method for increasing throughput of encapsulated data over a network, the computerized method comprising:
determining, at a first network device, a number of available processing resources located at a second network device;
generating a plurality of connections between the first network device and the second device, the plurality of connections corresponding in number to the number of available processing resources;
associating data received by the first network device with a first connection of the plurality of tunneling connections;
generating translation data unique to a tunneling session associated with the first connection; and
encapsulating the received data with the translation data to generate the encapsulated data for transmission to the second network device.

12. The computerized method of claim 11, wherein the first network device is deployed as part of a cloud-computing environment.

13. The computerized method of claim 12, wherein the available processing resources corresponding to elastic computing devices.

14. The computerized method of claim 13, wherein each of the elastic computing devices corresponds to a virtualized processor.

15. The computerized method of claim 11, wherein the generating of the translation data by at least conducting a hashing operation on information associated with an Internet Protocol (IP) header for one or more packets corresponding to the received data.

16. The computerized method of claim 11, wherein the generating of the translation data is further conducted by at least conducting a modulo operation on a hash result generated from the hashing operation.

17. The computerized method of claim 11, wherein the first plurality of connections correspond to a first plurality of tunnels operating in accordance with Internet Protocol Security (IPSEC).

18. The computerized method of claim 11, wherein the first plurality of connections correspond to a first plurality of tunnels operating in accordance with Generic Routing Encapsulation (GRE).

19. A network device, comprising:
a tunneling logic to generate and manage a first plurality of connections, each of the first plurality of connections associated with a virtual computing resource; and
a demultiplexer logic configured to (i) receive a plurality of data for transmission, (ii) associate the received data with a first connection of the first plurality of connections, (iii) generate translation data unique to a tunneling session associated with the first connection of the first plurality of connections, and (iv) encapsulate the received data with the translation data prior to transmission during the tunneling session.

20. The system of claim 19, wherein the demultiplexer logic is configured to generate the translation data by at least conducting a hashing operation on information associated with an Internet Protocol (IP) header for one or more packets corresponding to the received data.

21. The system of claim 19, wherein the demultiplexer logic is configured to generate the translation data by conducting a modulo operation on a hash result generated by the hashing operation being conducted on information associated with the IP header for one or more packets.

22. The system of claim 19, wherein the first plurality of connections correspond to a first plurality of tunnels operating in accordance with Internet Protocol Security (IPSEC).

23. The system of claim 1, wherein the demultiplexer logic is configured to generate the translation data based on meta data associated with one or more packets corresponding to the received data.

* * * * *